United States Patent
Schmidt

[19]

[11] Patent Number: 6,124,877
[45] Date of Patent: Sep. 26, 2000

[54] SYSTEM FOR MONITORING AND REPORTING VIEWING OF TELEVISION PROGRAMMING

[75] Inventor: David Schmidt, Rowayton, Conn.

[73] Assignee: Soundview Technologies, Inc., Greenwich, Conn.

[21] Appl. No.: 08/986,918

[22] Filed: Dec. 8, 1997

[51] Int. Cl.[7] .................................................. H04N 7/00
[52] U.S. Cl. ............................................. 348/2; 348/5.5
[58] Field of Search .................................. 348/1–5; 455/2

[56] References Cited

U.S. PATENT DOCUMENTS

| | | | |
|---|---|---|---|
| 4,390,901 | 6/1983 | Keiser ...................................... | 358/147 |
| 4,488,179 | 12/1984 | Kruger et al. ........................... | 358/181 |
| 4,554,584 | 11/1985 | Elam et al. .............................. | 358/165 |
| 4,598,288 | 7/1986 | Yarbrough et al. ................. | 340/825.34 |
| 4,605,964 | 8/1986 | Chard ...................................... | 358/147 |
| 4,633,495 | 12/1986 | Scholtz ........................................ | 387/3 |
| 5,425,100 | 6/1995 | Thomas et al. .......................... | 348/1 X |
| 5,481,294 | 1/1996 | Thomas et al. .............................. | 348/1 |

*Primary Examiner*—Nathan Flynn
*Attorney, Agent, or Firm*—Lockwood, Alex, Fitzgibbon & Cummings

[57] ABSTRACT

A system for monitoring and reporting the viewing of television programs on a television receiver includes an RF probe which is positioned on the exterior of the receiver housing in close proximity to the intermediate frequency amplifier of the receiver to pick up the intermediate frequency signal therein. A demodulator circuit derives a composite video signal from the intermediate frequency signal. A closed captioning chip and decoder derive channel and/or program information from line 21 of the composite signal, which information is periodically stored in a memory with associated time, date and viewer ID information. The stored viewing information is periodically transmitted by modem to a central monitoring location for analysis. In an alternative embodiment the viewing information is transferred to a removable memory card which is mailed to the central monitoring location.

29 Claims, 8 Drawing Sheets

SYSTEM FOR MONITORING AND REPORTING VIEWING OF TELEVISION PROGRAMMING

BACKGROUND OF THE INVENTION

The present invention relates generally to a system for monitoring and reporting the viewing of television programs, and more particularly to an apparatus for use with a conventional television receiver for monitoring the operation of the receiver without direct electrical connection to the circuitry thereof.

Several media research organizations such as Neilsen Media Research, Inc., Statistical Research Inc., and Arbitron Corporation, provide popularity ratings of television programs on a local and national basis based on the viewing habits of a representative sample of viewers. This rating information is valuable to advertisers since it enables them to select programs and broadcast times which are most effective for selling their product.

Typically, program viewing information has been collected from viewers by the media research organizations either by having the viewer complete a reporting form identifying programs watched on a 24 hours basis, which form would be mailed in every week, or by connecting a recording apparatus to the viewer's television receiver, which apparatus would regularly report the viewer's viewing habits to a central office. The use of a reporting form often proved to be burdensome to the viewer, causing the viewer to miss making entries or to make wrong entries. The use of apparatus connected to the viewer's receiver also often proved burdensome, since prior apparatus designed for this purpose required direct electrical connection to, and often modification of, the circuitry of the receiver. Furthermore, the apparatus was also undesirably expensive to install because the direct electrical connection required a technician to travel to the user's premises.

The present invention avoids these deficiencies by providing a monitoring and reporting apparatus which monitors on a real time basis the program viewed on a television receiver without any direct electrical connection to the receiver. This viewing information, including the channel and/or program, the time and date of viewing, and a viewer ID number is then sent by telephone line to a central office for processing.

Direct electrical connection to the television receiver is avoided through the use of a radio frequency (RF) probe, which is tuned to the 45 MHZ intermediate frequency (IF) universally used in television receivers. The RF probe is attached to the outside surface of the receiver cabinet at a location which is in sufficiently close proximity to the IF amplifier portion of the receiver circuitry to enable the probe to pick-up the IF signal for processing. From that signal demodulation and decoding circuitry within the monitoring apparatus derives the channel and/or program identification.

In the United States the channel and/or program information is provided during the vertical blanking interval (VBI) on line 21 of the composite video signal, fields 1 and 2, two bytes per field, in accordance with standard 608 of the Electronics Industries Association (EIA). In further accordance with EIA Standard 608, this transmission channel also serves to convey ASCII format closed captioning, program data and rating information.

The channel and/or program viewing information is stored along with the date, time and user identification within an internal memory. The stored information is transmitted from the internal memory at regular intervals to a central monitoring facility wherein it is analyzed to develop program rating information.

Accordingly, it is a general object of the present invention to provide a new and improved system for monitoring and reporting the viewing of television programming.

It is a more specific object of the present invention to provide a system for monitoring and reporting television viewing information which does not require input from the viewer or a direct electrical connection to the television receiver.

It is a still more specific object of the present invention to provide an apparatus which automatically identifies and stores for later transmission to a media research organization a particular channel and/or program being viewed by a television receiver without a direct electrical connection to the receiver.

SUMMARY OF THE INVENTION

The invention is directed to a system for monitoring and reporting the viewing of television programs on a television receiver, which system comprises an RF probe for detecting intermediate frequency radiation from the intermediate frequency amplifier of the television receiver, the intermediate frequency radiation including a video component and an audio component; signal processing means coupled to the RF probe for deriving a signal indicative of the channel and/or program being watched on the television receiver, clock means for developing a signal indicative of current time and date; memory means for storing the channel and/or program data in association with the time and/or date signal, and communication means for periodically conveying the associated data from the memory means to a central monitoring facility for analysis.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
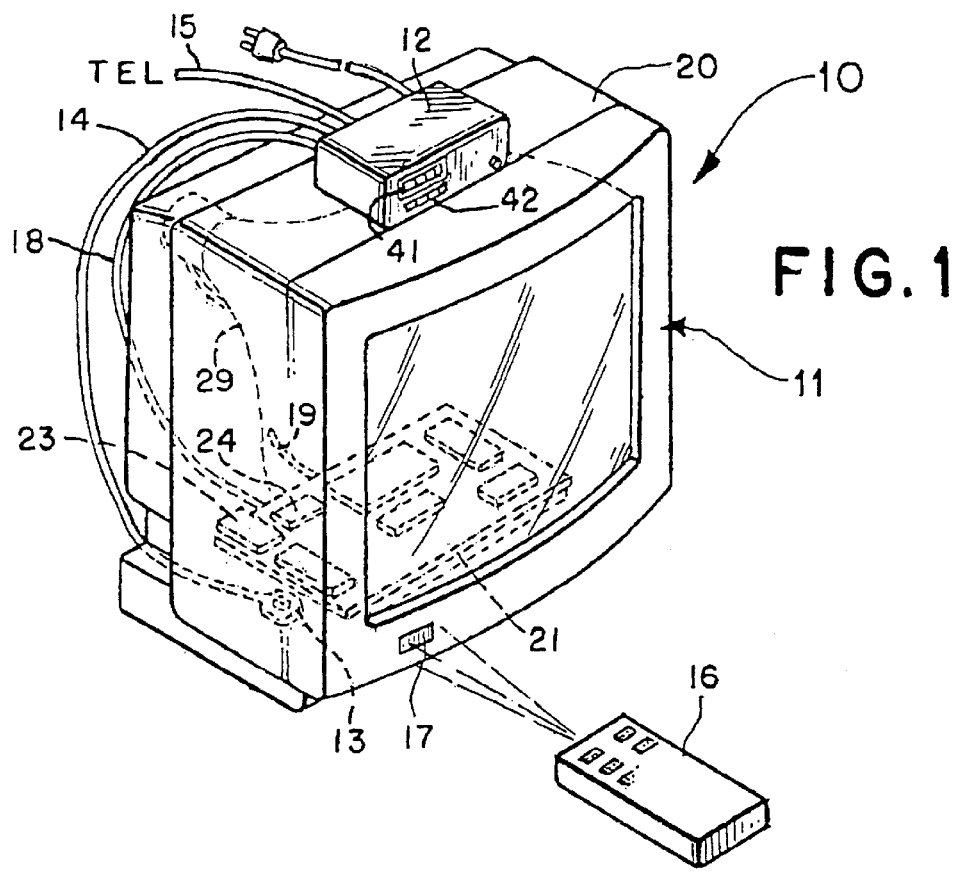
FIG. 1 is a perspective view of a television viewing, monitoring and reporting system constructed in accordance with the invention shown installed on a television receiver.
Figure 2:
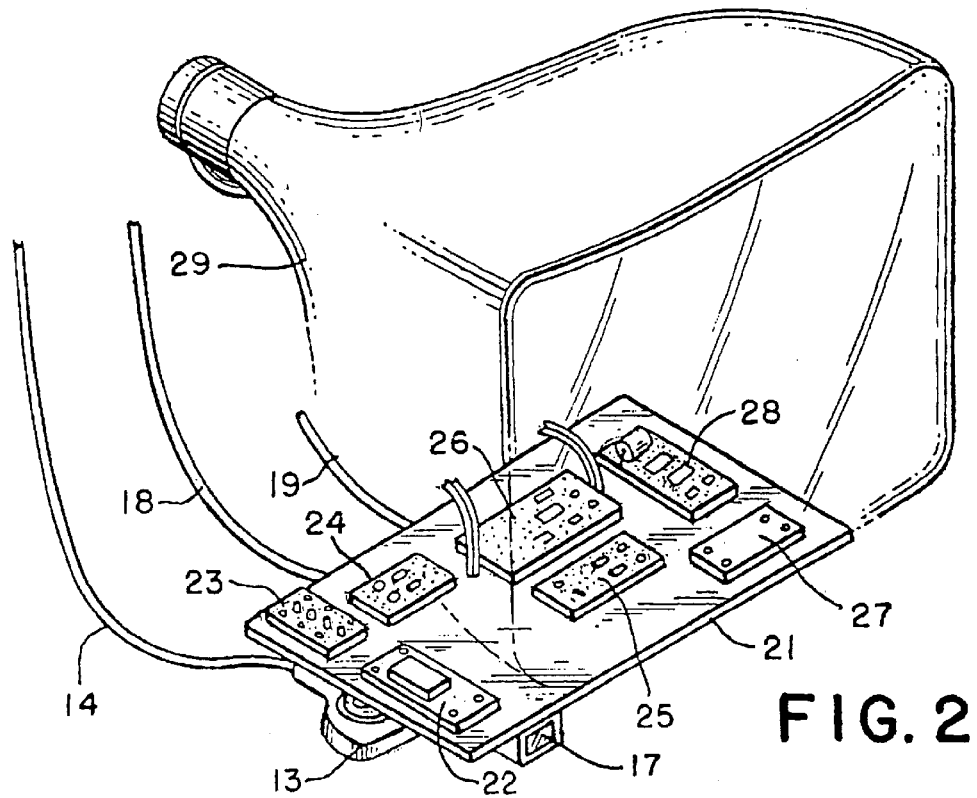
FIG. 2 is an enlarged perspective view of a portion of the circuitry of the television receiver of FIG. 1 showing the principal circuit portions thereof.
Figure 3:
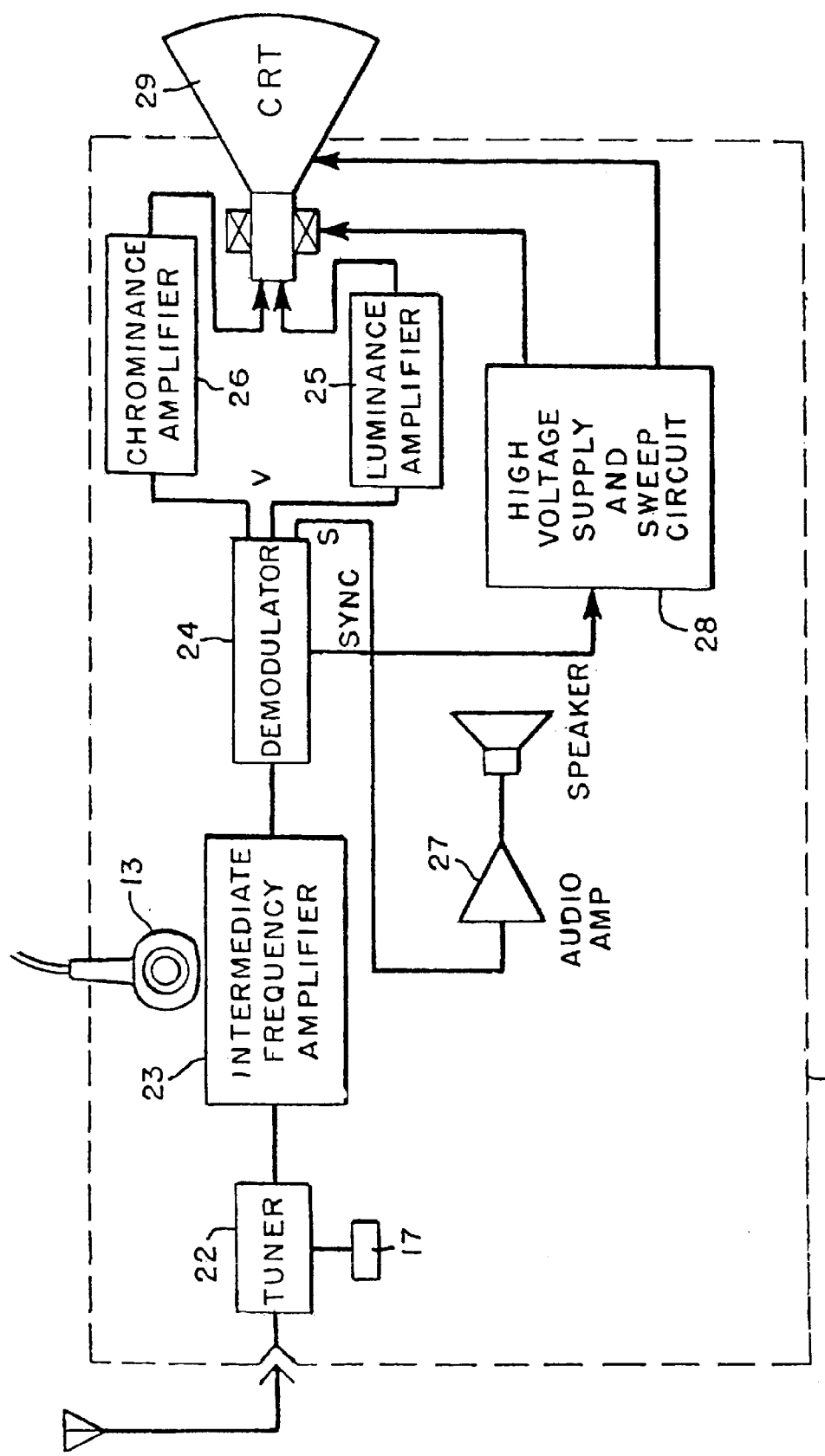
FIG. 3 is a simplified functional block diagram of the television receiver of FIGS. 1 and 2.

Referring to the drawings, and particularly to FIG. 1, a television viewing monitoring and reporting system 10 for use with a conventional television receiver 11 includes a monitoring and reporting module 12 positioned on or near the receiver. The television receiver may include a conventional infrared remote control module 16 providing tuning commands to an infrared receiver 17. A conventional power cable 18 and antenna cable 19 are also provided. The module 12 is connected to an RF probe 13 by a cable 14, and to a telephone line by a cable 15. Television receiver 11, in accordance with conventional practice, and as shown in FIGS. 2 and 3, includes a cabinet 20 within which is contained a circuit board 21 including thereon a plurality of individual receiver circuits, including a tuner circuit 22, an IF amplifier circuit 23, a demodulator circuit 24, a luminance amplifier circuit 25, a chrominance amplifier circuit 26, an audio amplifier circuit 27, and a high voltage power supply and sweep circuit 28. The luminance amplifier 25 and chrominance amplifier 26 provide drive signals for a conventional cathode ray tube 29, which is powered by the high voltage power supply and sweep circuit 28.

In operation, tuner circuit 22 (FIG. 3) selects a television channel for viewing in response to a tuning command, which may be provided either locally or by a remote control device via infrared detector 17. The sound and video components of the selected television channel appear at the output of the tuner at an intermediate frequency, typically 41.25 MHZ for the sound component and 45.75 MHZ for the video component.

These components are amplified in the IF amplifier 23 prior to application to demodulator 24, wherein an audio signal, a sync signal and a composite video signal are derived. The audio signal is amplified by audio amplifier 27 to drive a speaker. The sync signal is applied to high voltage and sweep circuit 28 to synchronize the CRT scan to the received signal, and the composite video signal is separated into chrominance and luminance components for application to chrominance amplifier 26 and luminance amplifier 25, respectively. A conventional power supply 30 provides operating power to the television receiver circuits.

The RF probe 13, which is preferably constructed in accordance with the teachings of U.S. Pat. No. 4,633,495 (Schotz), the disclosure of which is incorporated herein by reference, is positioned on the exterior surface of the cabinet 16 of television receiver 11, in close proximity to IF amplifier 23 on circuit board 21. The probe may be attached to the cabinet surface by any convenient means, an adhesive being preferred so as to avoid damage to the receiver cabinet.

It is necessary that the probe be positioned sufficiently close to the IF amplifier that an adequate IF leakage signal can be picked up. This typically requires the installer to move the probe about the cabinet (typically the underside) while observing the strength of the signal picked up by the probe. To this end, a conventional signal strength indicator 32 (FIG. 4), either in the form of a meter or a series of progressively lit LEDs, may be provided, either on the probe or in module 12.

Figure 4:
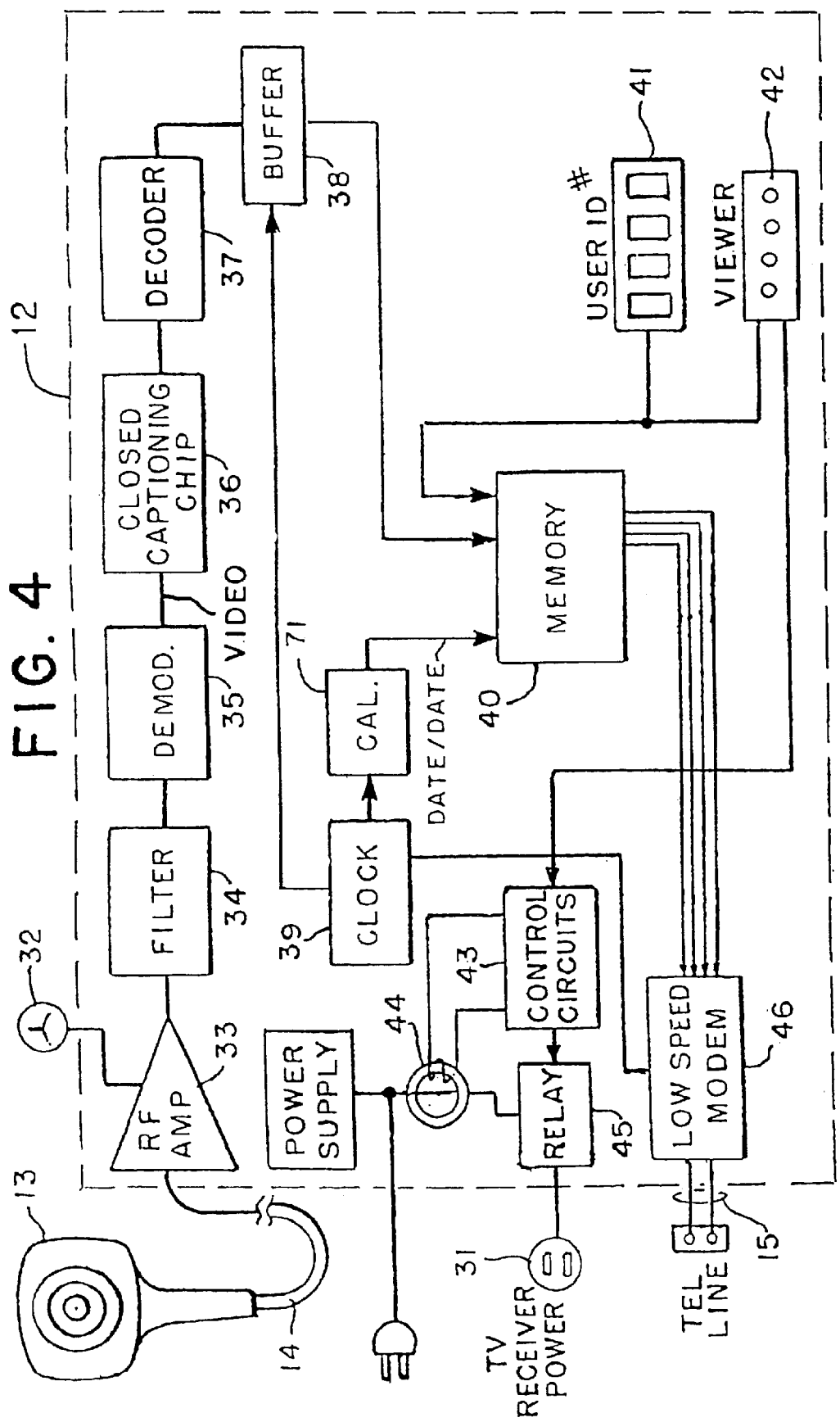
FIG. 4 is a simplified functional block diagram of the monitoring system of FIG. 1.

Referring to FIG. 4, within the monitoring and reporting module 12 the RF probe 13 is connected to an RF amplifier 33 which provides a bandpass at 45 MHZ to amplify the sound and video IF signal components picked up by the probe. The amplified IF signal is coupled through a filter 34 to a demodulator 35, wherein the video component is demodulated by conventional methods to produce a composite video signal for application to a closed captioning chip 36. The closed captioning chip, which may be conventional in structure and function, derives a two byte data signal from line 21 of each field. This data, which preferably corresponds to EIA Standard 608, is conveyed to a decoder circuit 37, wherein channel and/or program identification information incorporated in the data signal in accordance with EIA Standard is separated out for the program then being watched on television receiver 11.

Figure 5:
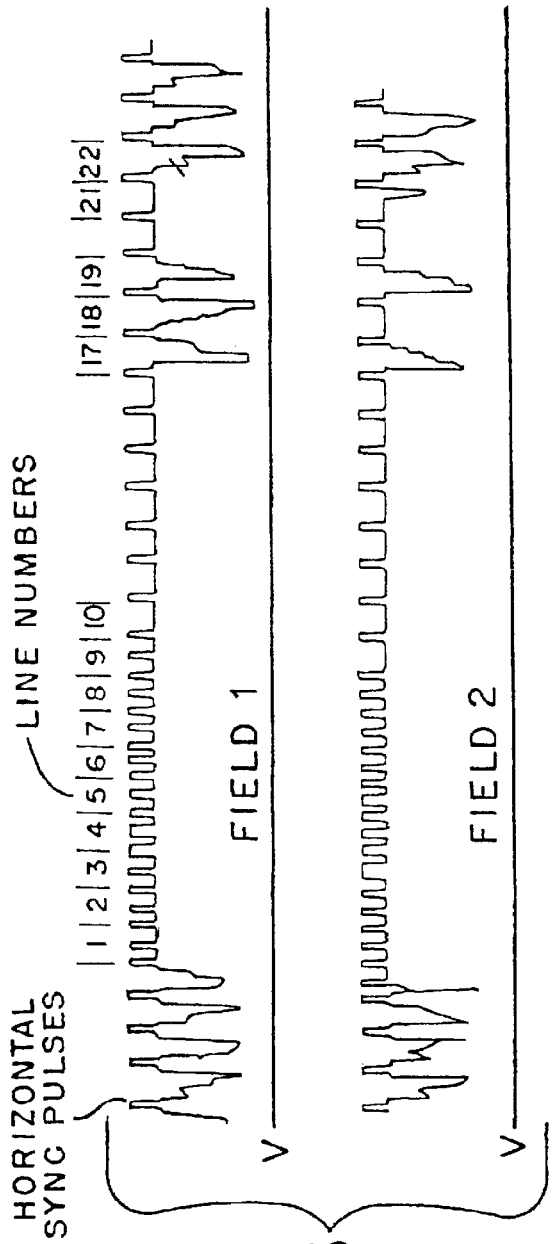
FIG. 5 is a depiction of a portion of a conventional composite video signal.
Figure 6:
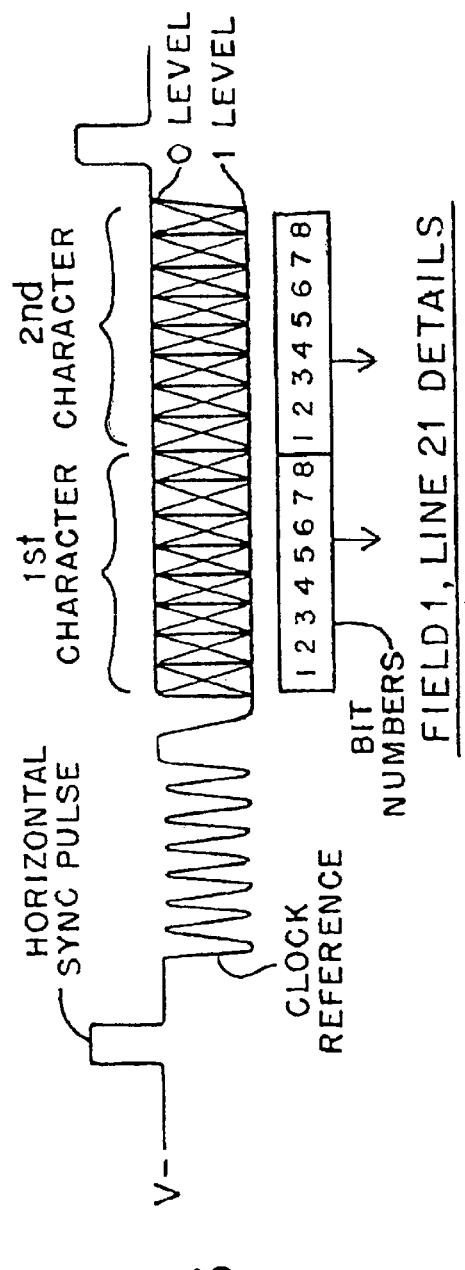
FIG. 6 is a depiction of line 21 of the composite video signal of FIG. 5 showing the provision of data thereon.

As shown in FIGS. 5 and 6, for U.S. NTSC format television transmissions EIA Standard 608 provides that for each field two bytes of data for closed captioning, program rating or program and/or channel identification purposes be provided on line 21 within the vertical blanking interval. This provides two 8 bit characters for each field, which are separated out by the closed captioning chip 36 (of FIG. 4). Decoder 37 analyzes the content of these characters and upon receipt of channel and/or program identifying data provides a signal to buffer 38 indicative of the program and/or channel being watched.

At periodic intervals, which may be as short as every 30 seconds, a clock circuit 39 causes the program and/or channel information in buffer 38 for the viewing period to be input into memory 40. Concurrently with this loading, a time and date are input by a calendar circuit 71, user information is input by a user ID switch circuit 41, viewer information is input by a viewer identification switch circuit 42. User ID switch circuit 41 may comprise a thumb-wheel type switch by which a unique ID number assigned by the monitoring company is set. This switch may be either on the front panel of the monitoring module 12, as shown in FIG. 1, or can be provided in a non-user accessible location within the module.

The viewer identification circuit 42 may comprise four lighted push-button switches uniquely assigned to multiple viewers in a single viewing household. When a particular viewer is viewing a television, his push button switch is actuated and lighted. When the viewer stops viewing, he resets his push button switch. When multiple viewers are watching, each viewer's respective push button switch is set. If the receiver is switched off, a control circuit 43 senses the switch off by means of a current transformer 44, resets the push button switches, and opens a relay 45, preventing the television receiver from operating until at least one push button switch is subsequently set.

The power cord 18 of the receiver may optionally be preferably inserted into an AC line outlet 31 (not shown in FIG. 1) on the rear of the monitoring and reporting module 12, which outlet is not powered unless one or more of the user identification switches 41 on the front panel of the module is closed to identify the person or persons in the viewing household viewing television receiver 11. In the event the receiver is switched off, all viewer identification switches 41 are automatically reset and the AC outlet 31 is unpowered pending user-actuation of one of the viewer identification switches.

Periodically, at reporting times determined by clock circuit 39, the contents of memory 40 for a reporting period are downloaded and sent through a conventional modem 46 and telephone line to a central monitoring office wherein the program/time/date/viewer data for each viewing period during the reporting period is analyzed to develop popularity rating information.

Figure 7:
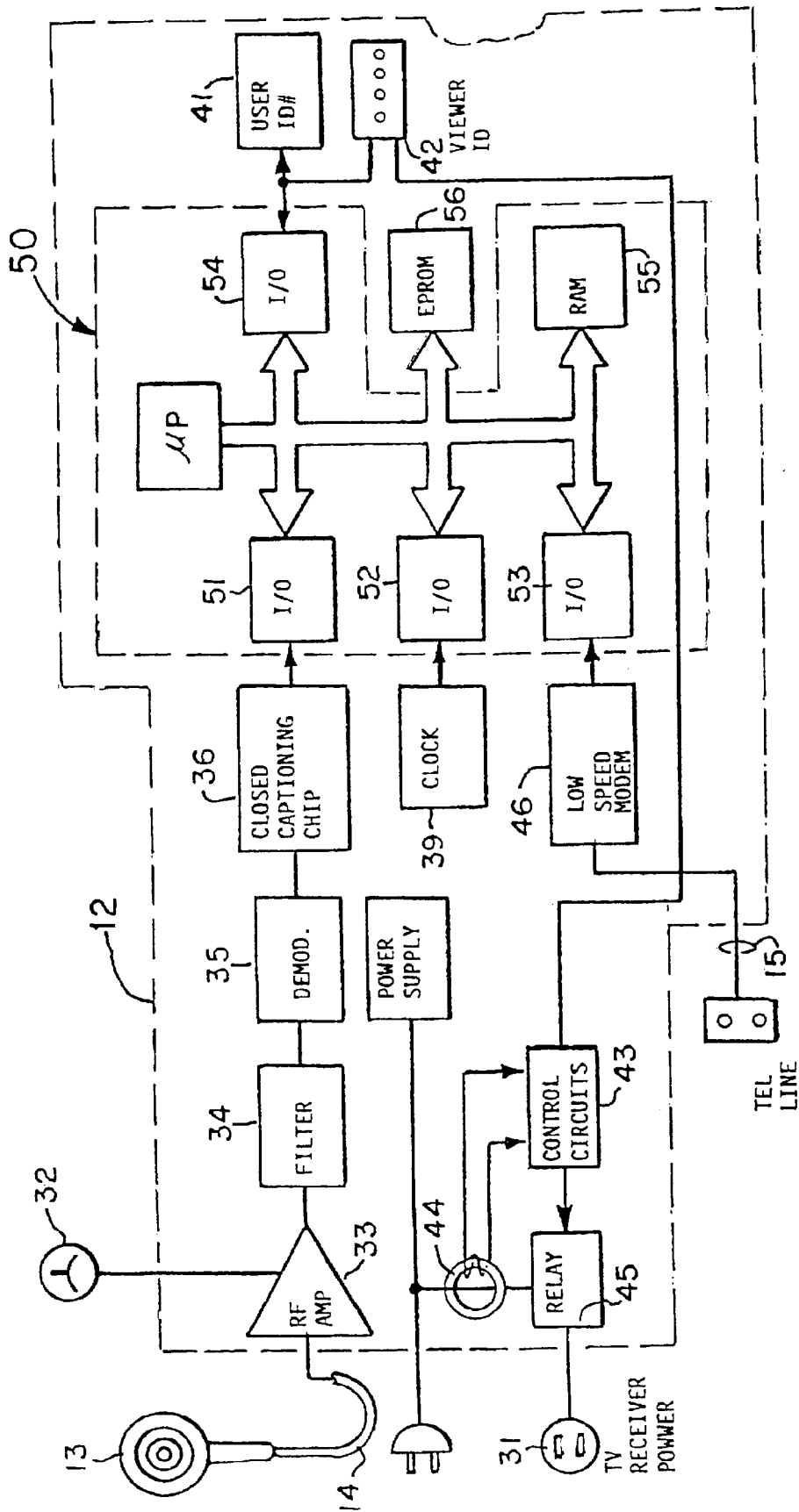
FIG. 7 is a simplified functional block diagram showing a microprocessor implementation of the monitoring and reporting system of FIGS. 1 and 3.

Referring to FIG. 7, the television viewing monitoring and reporting module 12, shown in discrete form in FIG. 14, can be advantageously constructed utilizing a conventional microprocessor. In particular, a microprocessor 50 may be provided having input/output ports 51–54 coupled to closed captioning chip 36, clock 39, modem 46 and user/viewer identification switches 41–42, respectively. Internally stored operating instructions cause the microprocessor to store channel/program/time/date/viewer/user information in a ram 55 for periodic transmission through modem 46 to a central monitoring facility.

Figure 8:
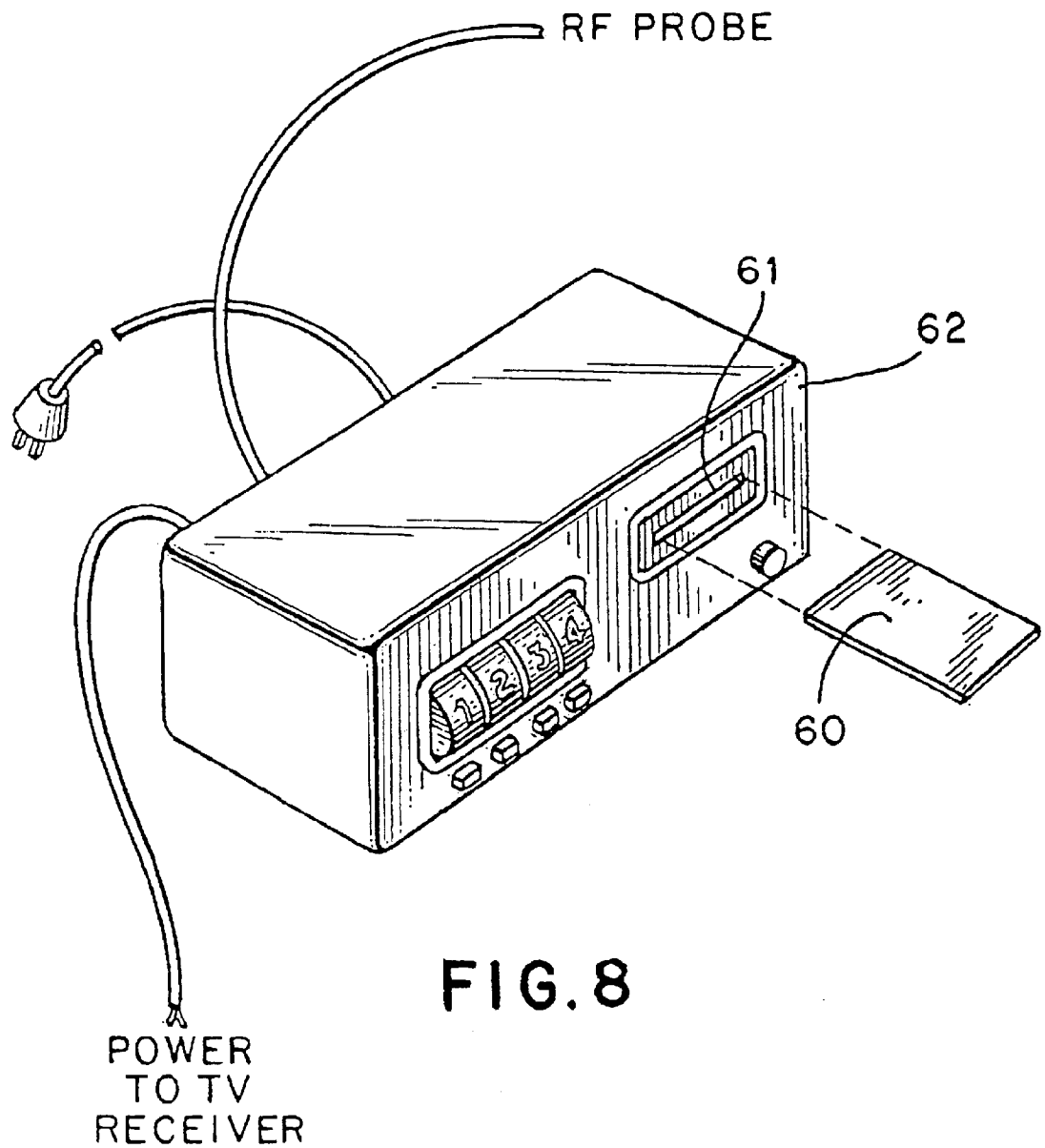
FIG. 8 is a perspective view of an alternate embodiment of the monitoring and reporting system of the invention wherein a removable memory card is utilized to report viewing data.
Figure 9:
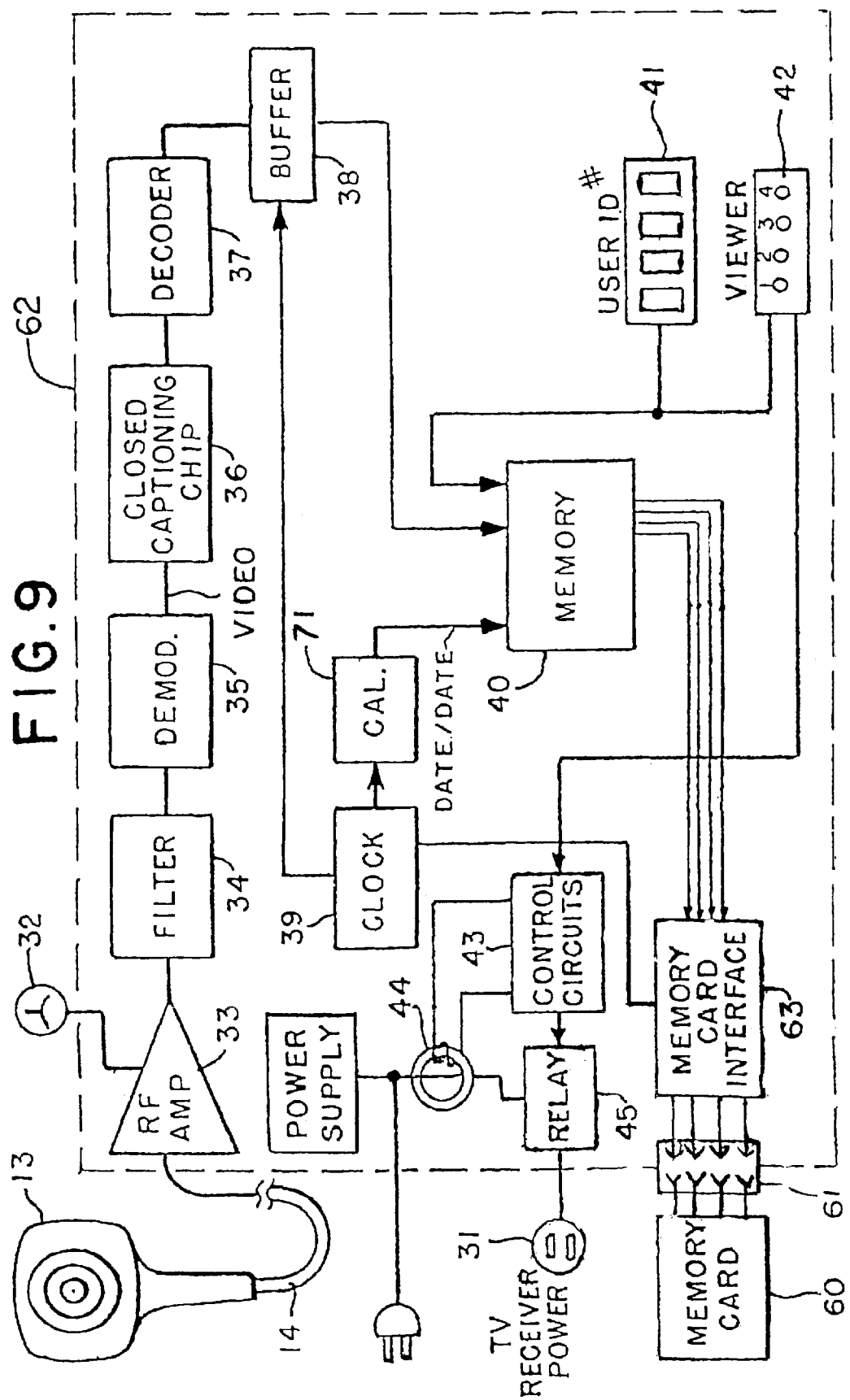
FIG. 9 is a simplified functional block diagram of the monitoring system of FIG. 8.
Figure 10:
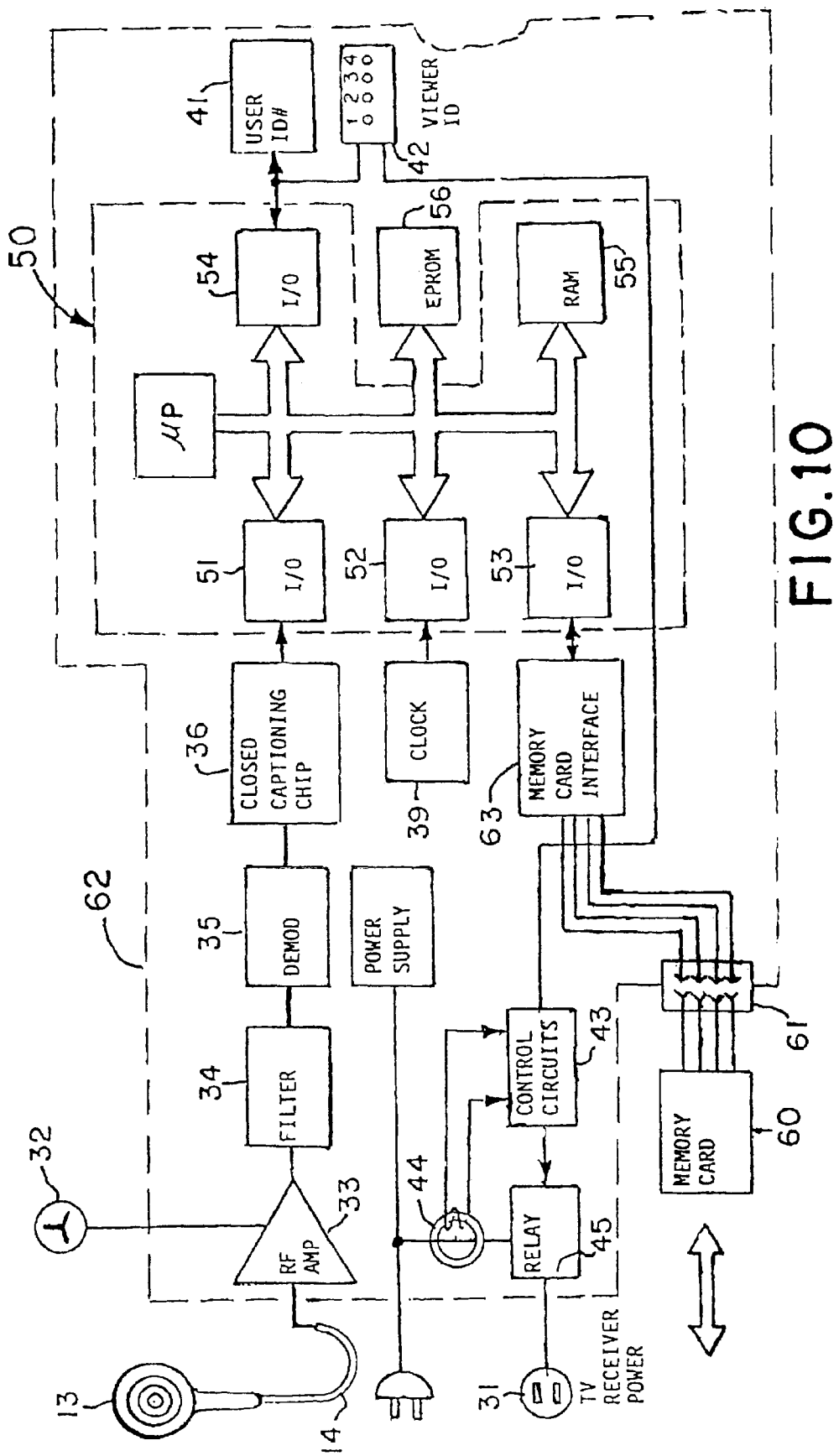
FIG. 10 is a simplified functional block diagram showing a microprocessor implementation of the monitoring system of FIGS. 8 and 9.

Referring to FIGS. 8–10, an alternate embodiment of the television viewing and reporting system of the present invention provides for the use of a removable memory in the form of a memory card 60 (a "flash card") for reporting viewing habits to a central facility. In this case, the card is simply removed from the monitoring module and sent by mail to the facility and a new card is inserted in its place. As shown in the Figures, the card is received in a socket 61 in a monitoring and reporting module 62, which may in other respects be identical in structure and operation to module 12. A memory card interface circuit 63 within module 62 replaces modem 46, serving to periodically load viewing data for a reporting period into the memory card. At some appointed time, such as on a particular date or day of the week, the card is removed and mailed out and a new card is installed. To prevent confusion, each memory card may be pre-assigned to a particular reporting period, by means of data contained therein, and downloading of data, from the monitoring and reporting module, or even operation of the receiver, may be inhibited in the event an installed memory card is not assigned to the current reporting period. In this case the monitoring and reporting module 62 reads the reporting period data from the memory card and then signals to the user via front panel LEDs indicating the acceptance or rejection of the card.

Thus, a system for accurately monitoring and reporting television viewing on a television receiver has been described. The system requires minimal input on the part of the viewer, making it unobtrusive in daily use and immune from the human errors inherent in prior monitoring systems. Furthermore, the system does not require modification of, or direct electrical connection to a monitored television receiver, making it economical to install and more acceptable to a viewer.

While particular embodiments of the invention have been shown and described, it will be obvious to those skilled in the art that changes and modifications may be made therein without departing from the invention in its broader aspects, and, therefore, the intent in the appended claims is to cover all such changes and modifications as fall within the true spirit and scope of the invention.

I claim:

1. A system for monitoring and reporting the viewing of television programming on a television receiver, comprising:
    an RF probe for detecting intermediate frequency radiation from the intermediate frequency amplifier of the television receiver, said intermediate frequency radiation including a video component and an audio component;
    signal processing means coupled to said RF probe for deriving a signal indicative of the channel and/or program being watched on the television receiver;
    clock means for developing a signal indicative of current time and/or date;
    memory means for storing said channel and/or program data in association with said time and/or date signal; and
    a removable memory card or the like for periodically conveying said associated data from said memory means to a central monitoring facility for analysis, said card being pre-assigned to a particular reporting period.

2. A monitoring and reporting system as defined in claim 1 wherein said RF probe is tuned to said intermediate frequency.

3. A monitoring and reporting system as defined in claim 1 wherein said detected intermediate frequency signal includes a video component and an audio component, and said signal processing means include demodulator means for deriving a composite video signal from said video component.

4. A monitoring and reporting system as defined in claim 3 wherein said signal processing means include means for deriving digital data from said composite video signal.

5. A monitoring and reporting system as defined in claim 4 wherein said means for deriving digital data derive digital data from line 21 of at least one field in said composite signal.

6. A monitoring and reporting system as defined in claim 5 wherein said digital data is derived from line 21 in both fields of said composite video signal.

7. A monitoring and reporting system as defined in claim 1 wherein said memory means comprise a RAM.

8. A monitoring and reporting system as defined in claim 1 wherein said signal processing means includes a microprocessor.

9. A monitoring and reporting system as defined in claim 1 wherein said communication means comprise a telephone line modem.

10. A monitoring and reporting system as defined in claim 1 including means for developing a user ID signal, and wherein said memory means store said user ID signal in association with said channel and/or program and time and date identification signals.

11. A monitoring and reporting system as defined in claim 10 including means for developing a viewer ID signal, and wherein said memory means store said viewer ID signal in association with said channel and/or program and time and date identification signals.

12. A monitoring and reporting system as defined in claim 10 wherein said means for developing a viewer ID signal comprise a user-actuated switch.

13. A monitoring and reporting system as defined in claim 1 further including a sensing means for determining whether said receiver is on or off.

14. A monitoring and reporting system as defined in claim 13 wherein said sensing means includes a current detector.

15. A monitoring and reporting system as defined in claim 1 further including a signal strength indicator for indicating the strength of said intermediate frequency radiation.

16. A system for monitoring and reporting the viewing of television programming on a television receiver, comprising:
    an RF probe for detecting intermediate frequency radiation from the intermediate frequency amplifier of the television receiver, said intermediate frequency radiation including a video component and an audio component;
    demodulation means for deriving a composite video signal from said intermediate frequency video component;
    means for deriving digital data from said composite video signal;

decoding means for deriving a signal indicative of the channel and/or program being watched on the television receiver from said digital data;

clock means for developing a signal indicative of current time and date;

memory means for storing said channel and/or program data in association with said time and date signal; and a removable memory card or the like for periodically conveying said associated data from said memory means to a central monitoring facility for analysis, said card being pre-assigned to a particular reporting period.

17. A monitoring and reporting system as defined in claim 16 wherein said RF probe is tuned to said intermediate frequency.

18. A monitoring and reporting system as defined in claim 16 wherein said means for deriving digital data derive digital data from line 21 of at least one field in said composite signal.

19. A monitoring and reporting system as defined in claim 16 wherein said digital data is derived from line 21 in both fields of said composite video signal.

20. A monitoring and reporting system as defined in claim 16 wherein said memory means comprise a RAM.

21. A monitoring and reporting system as defined in claim 16 wherein said signal processing means includes a microprocessor.

22. A monitoring and reporting system as defined in claim 16 wherein said communication means comprise a telephone line modem.

23. A monitoring and reporting system as defined in claim 16 including means for developing a user ID signal, and wherein said memory means store said user ID signal in association with said channel and/or program identification signals and said date and time identification signals.

24. A monitoring and reporting system as defined in claim 23 including means for developing a viewer ID signal, and wherein said memory means store said viewer ID signal in association with said channel and/or program and time and time identification signals.

25. A monitoring and reporting system as defined in claim 24 wherein said means for developing a viewer ID signal comprise a user-actuated switch.

26. A monitoring and reporting system as defined in claim 16 further including a sensing means for determining whether said receiver is on or off.

27. A monitoring and reporting system as defined in claim 26 wherein said sensing means includes a current detector.

28. A monitoring and reporting system as defined in claim 16 further including a signal strength indicator for indicating the strength of said intermediate frequency radiation.

29. A system for monitoring and reporting the viewing of television programming on a television receiver, comprising:

an RF probe for detecting intermediate frequency radiation from the intermediate frequency amplifier of the television receiver, said intermediate frequency radiation including a video component and an audio component;

signal processing means coupled to said RF probe for deriving a signal indicative of the channel and/or program being watched on the television receiver;

clock means for developing a signal indicative of current time and/or date;

memory means for storing said channel and/or program data in association with said time and/or date signal;

a removable memory card or the like for periodically conveying said associated data from said memory means to a central monitoring facility for analysis, said card being pre-assigned to a particular reporting period; and disabling means for disabling said receiver when said card is not assigned to the current reporting period.

* * * * *